(12) United States Patent
Kroll et al.

(10) Patent No.: US 10,969,266 B2
(45) Date of Patent: Apr. 6, 2021

(54) WEIGH SCALE TECHNOLOGY

(71) Applicants: William P. Kroll, Medina, MN (US);
Randie Evenson, Medina, MN (US);
Ryan Peters, Medina, MN (US)

(72) Inventors: William P. Kroll, Medina, MN (US);
Randie Evenson, Medina, MN (US);
Ryan Peters, Medina, MN (US)

(73) Assignee: Intercomp Company, Medina, MN (US)

( * ) Notice: Subject to any disclaimer, the term of this patent is extended or adjusted under 35 U.S.C. 154(b) by 0 days.

(21) Appl. No.: 16/691,245

(22) Filed: Nov. 21, 2019

(65) Prior Publication Data

US 2020/0158559 A1 May 21, 2020

Related U.S. Application Data

(60) Provisional application No. 62/770,559, filed on Nov. 21, 2018.

(51) Int. Cl.
*G01G 21/14* (2006.01)
*G01G 21/22* (2006.01)
*G01G 3/14* (2006.01)

(52) U.S. Cl.
CPC ............... *G01G 3/14* (2013.01); *G01G 21/14* (2013.01); *G01G 21/22* (2013.01)

(58) Field of Classification Search
CPC ............ G01G 3/14; G01G 21/22; G01G 21/14
USPC ........................................................ 177/211
See application file for complete search history.

(56) References Cited

U.S. PATENT DOCUMENTS

| 5,232,064 A * | 8/1993 | Kroll ............... G01G 19/025 |
| | | 177/211 |
| 5,646,376 A * | 7/1997 | Kroll ................... B29C 48/03 |
| | | 177/211 |
| 5,894,112 A * | 4/1999 | Kroll ................... G01G 19/07 |
| | | 177/134 |
| 2003/0234122 A1* | 12/2003 | Kroll ................... G01G 19/083 |
| | | 177/146 |
| 2005/0115745 A1* | 6/2005 | Kroll ................... G01G 19/027 |
| | | 177/126 |

* cited by examiner

*Primary Examiner* — Jacques M Saint Surin
(74) *Attorney, Agent, or Firm* — Skinner and Associates; Joel D. Skinner, Jr.

(57) ABSTRACT

A weighing scale is disclosed. The scale includes a base, a load cell assembly coupled to the base, and a platform coupled to the load cell assembly. Also disclosed are alternative embodiments of the load cell assembly and methods of making and using the scale.

16 Claims, 15 Drawing Sheets

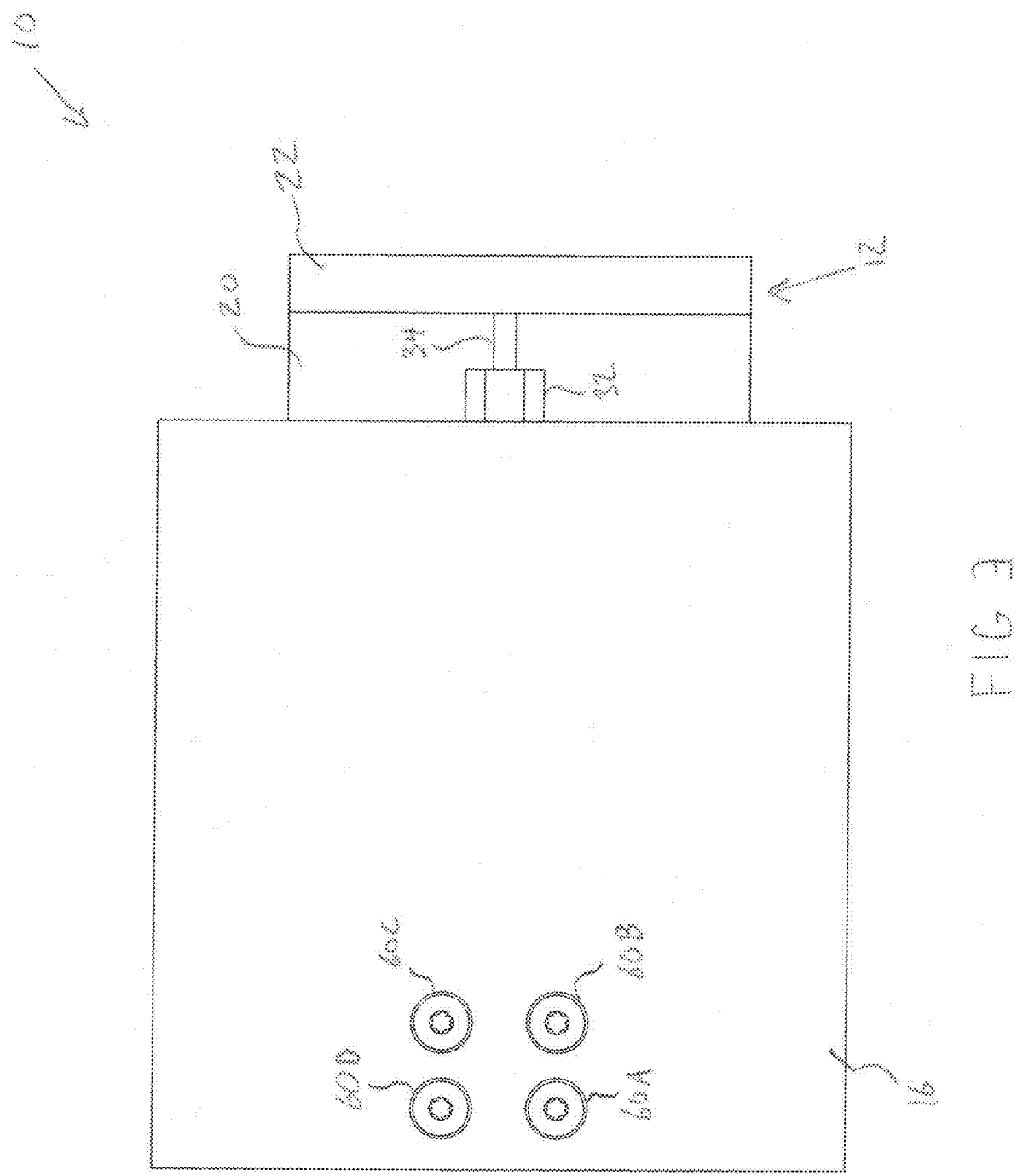

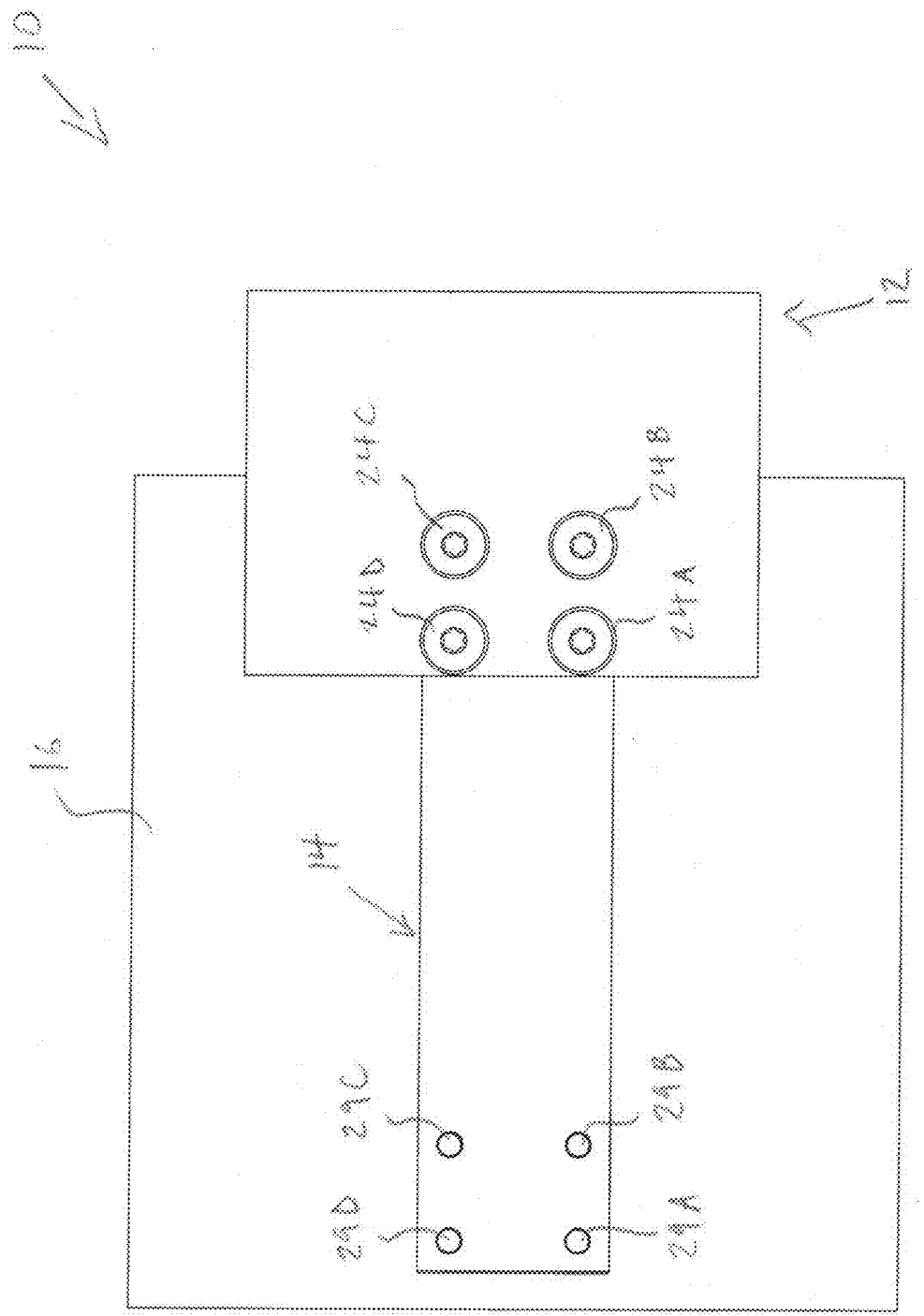

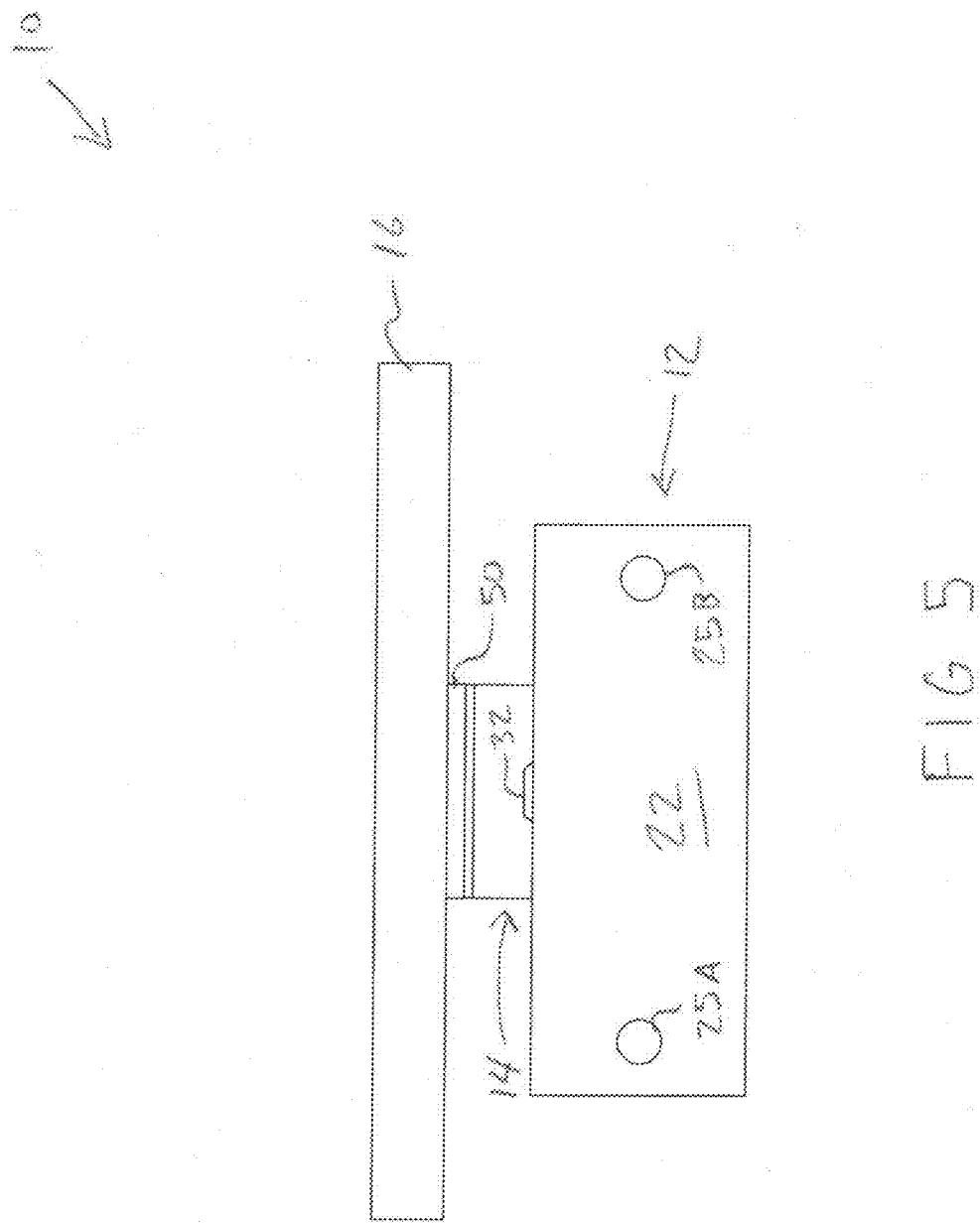

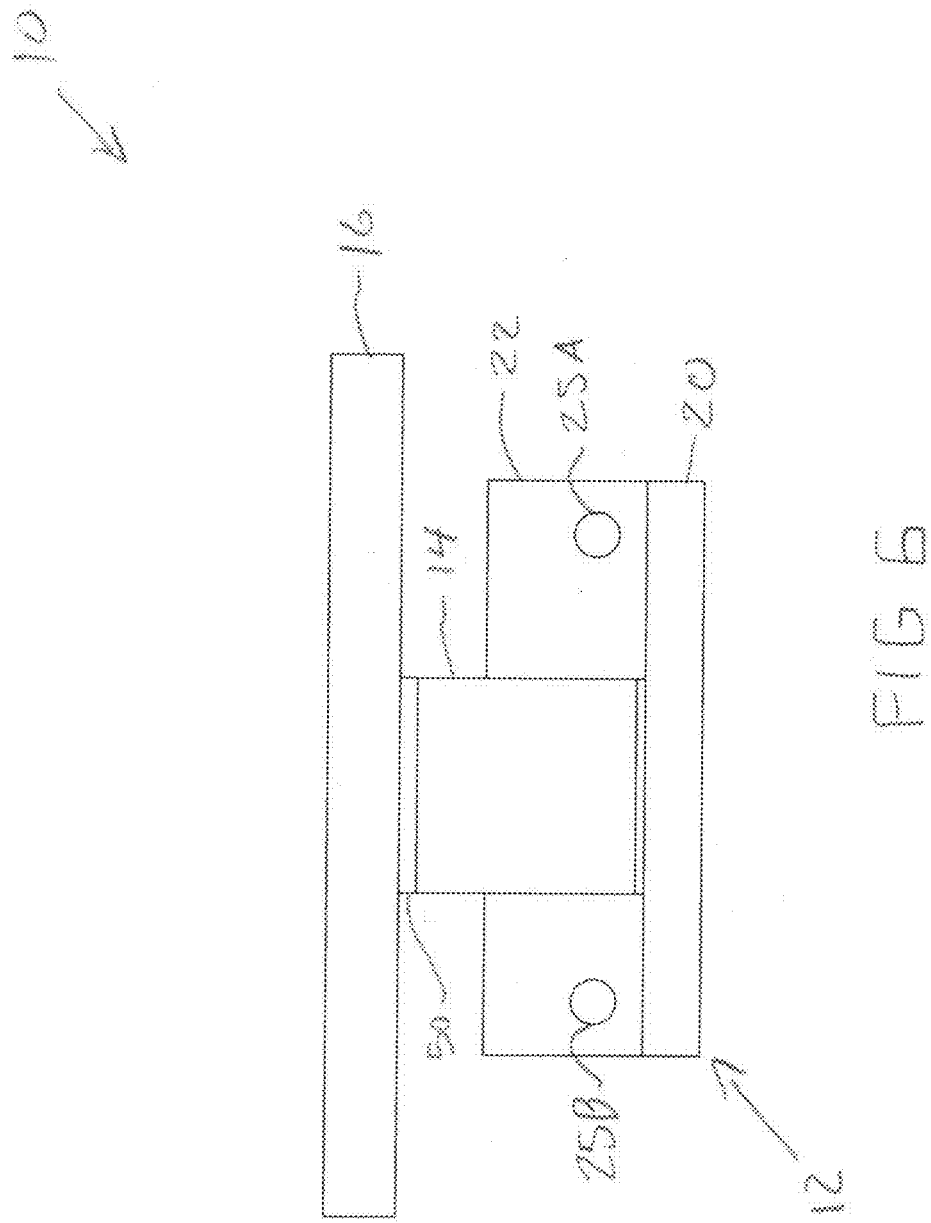

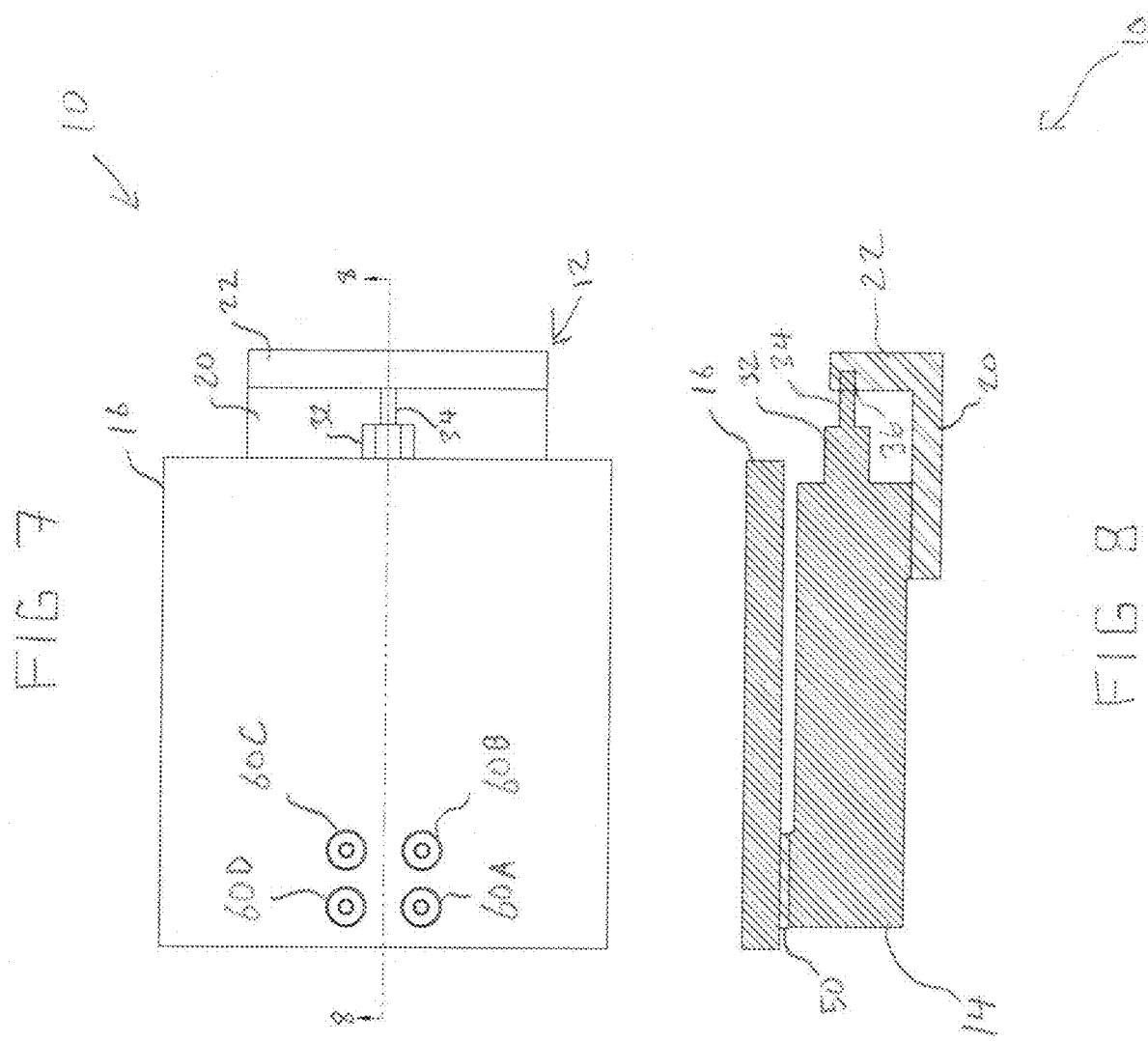

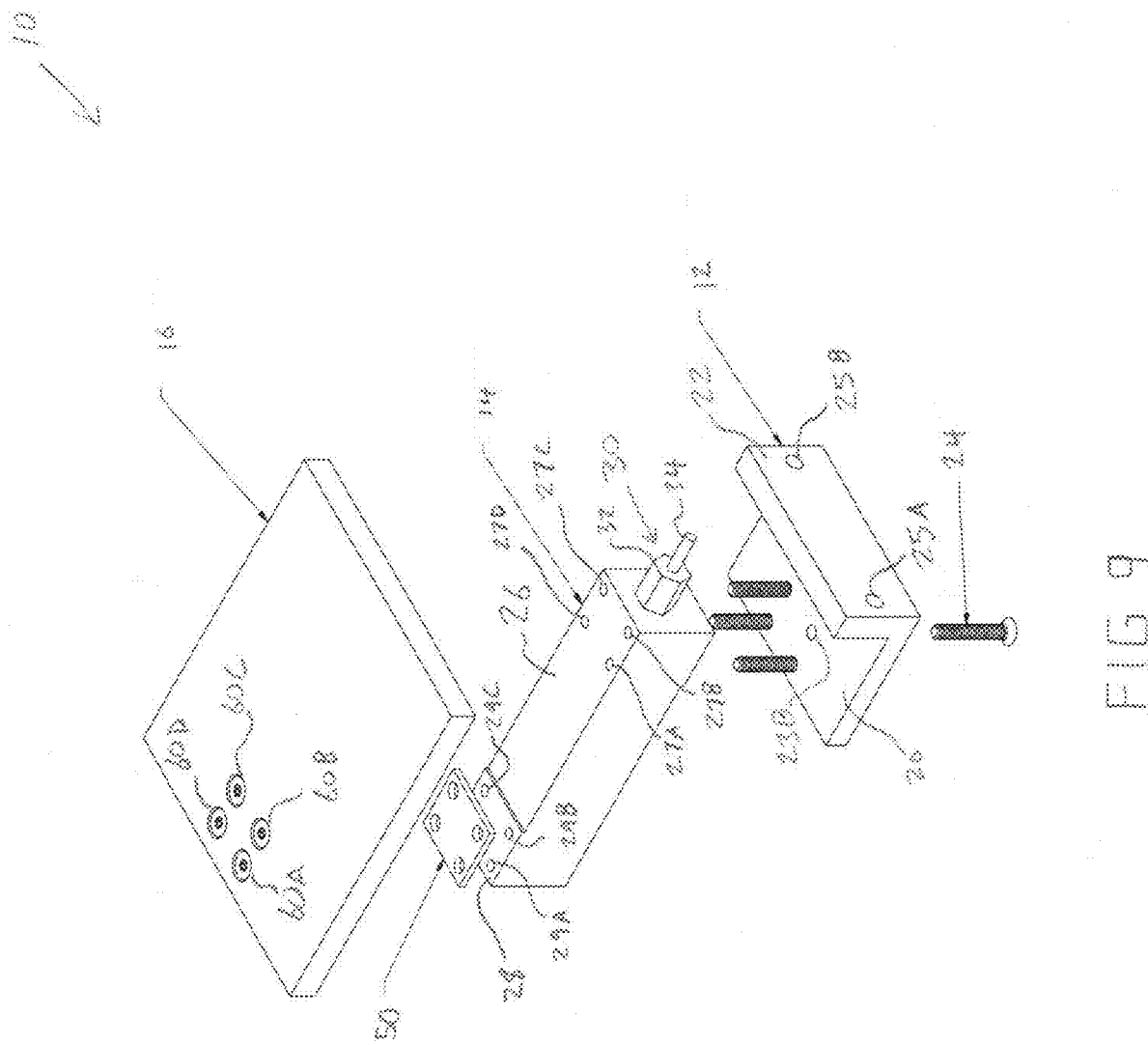

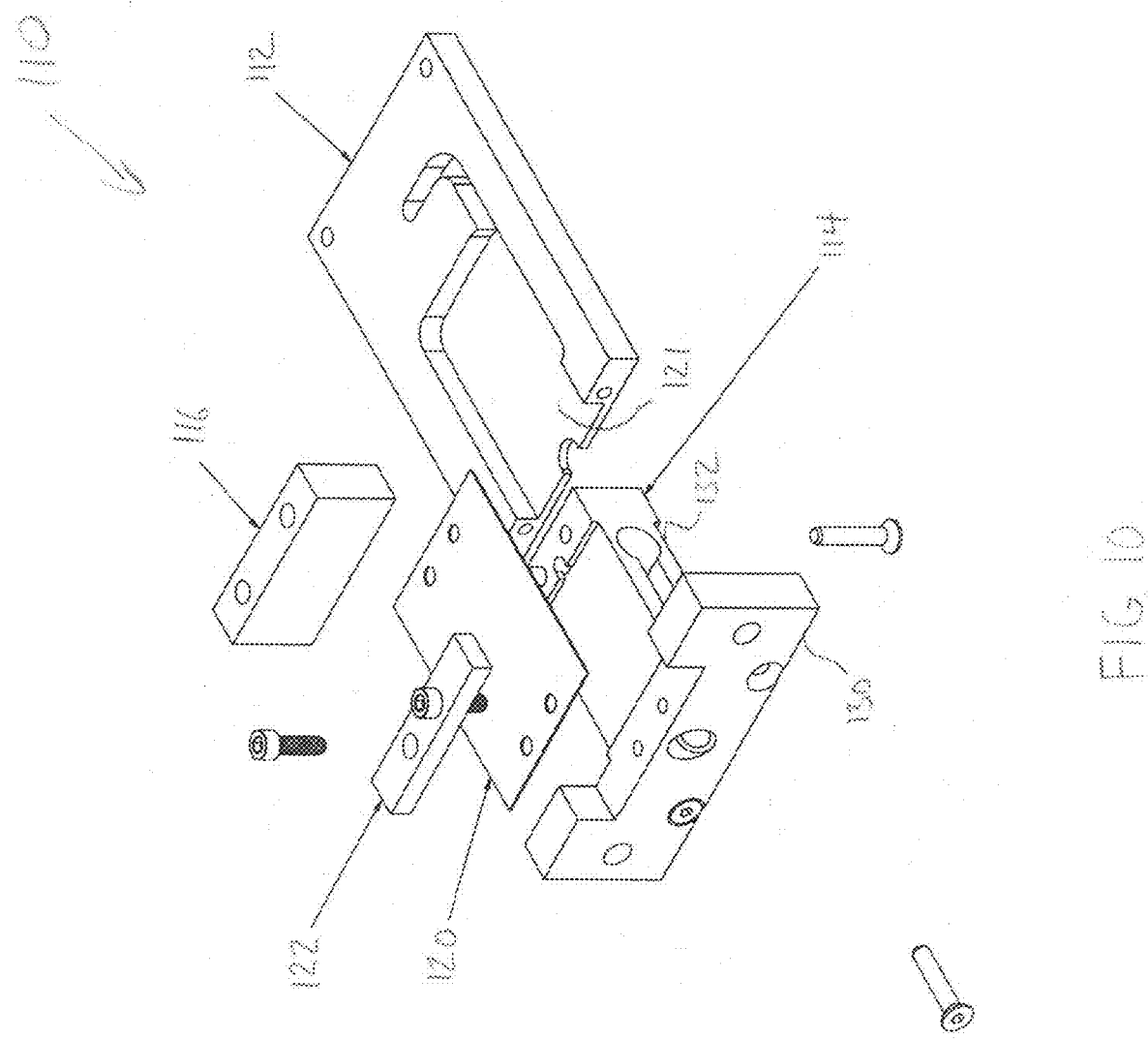

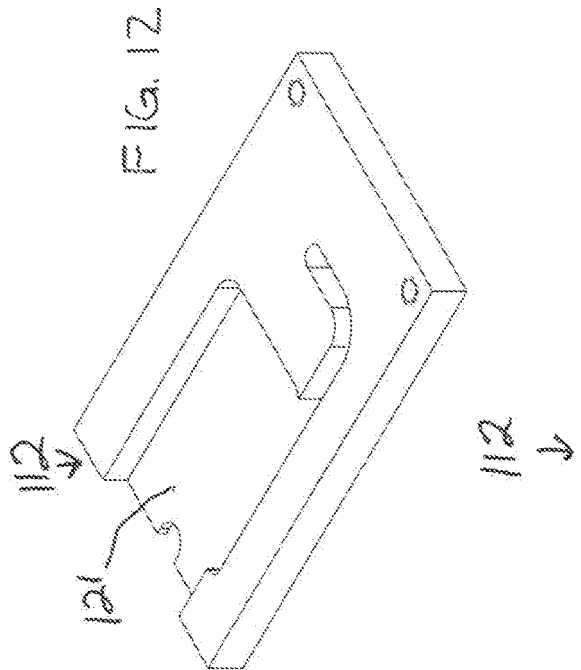
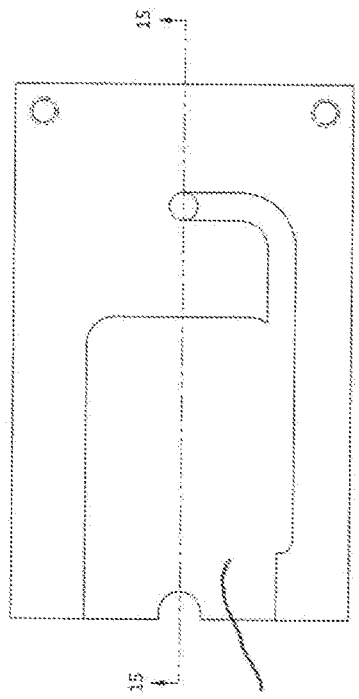
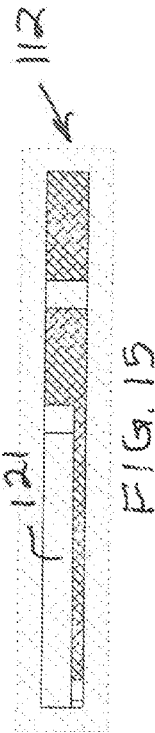
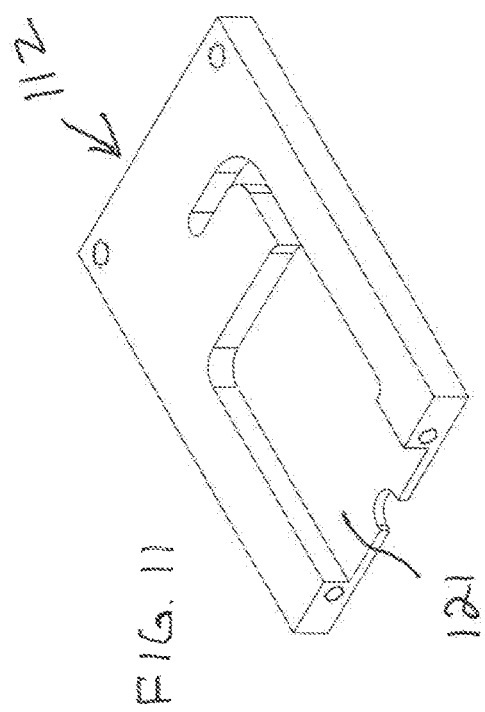
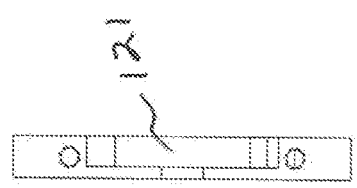

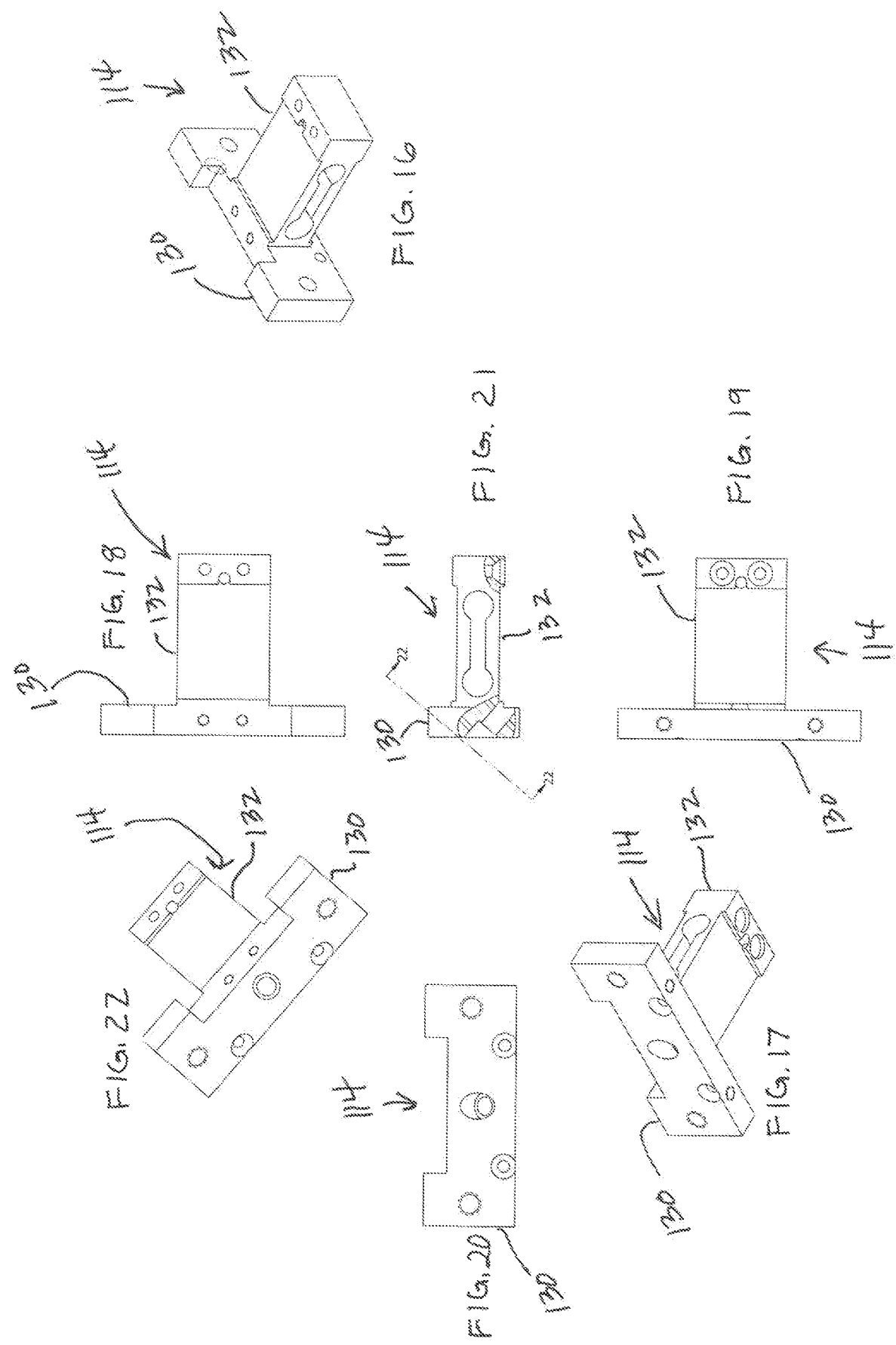

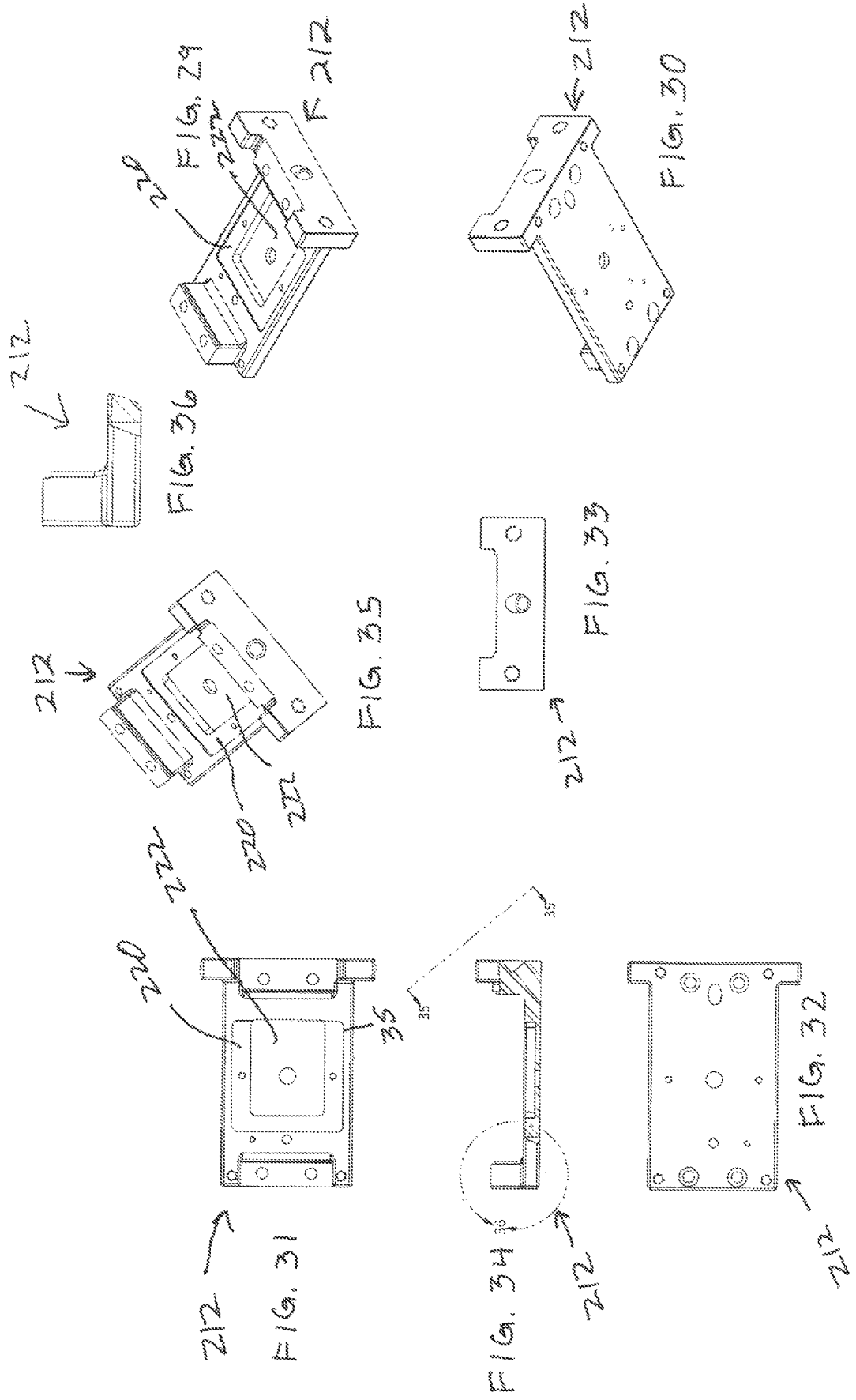

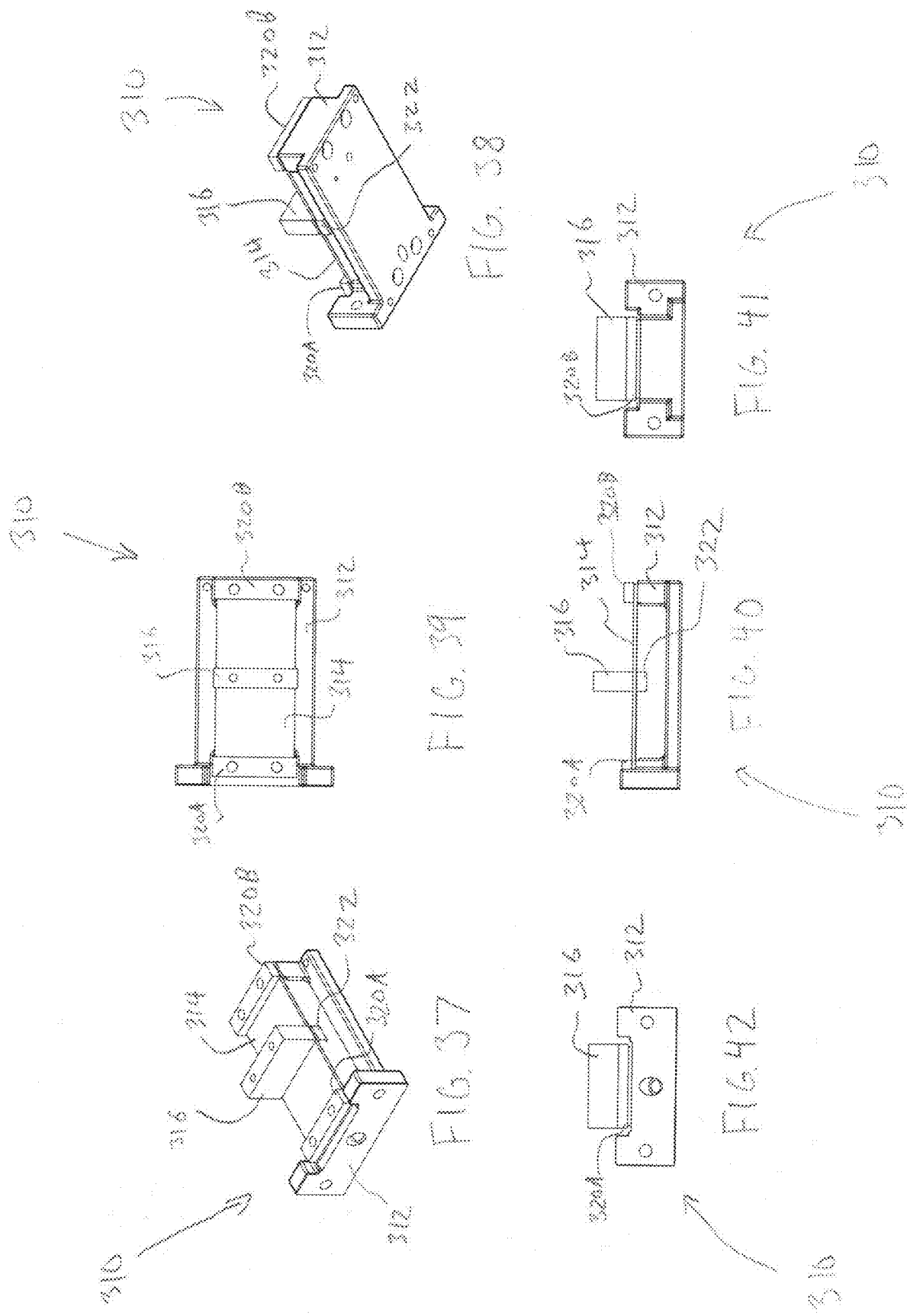

WEIGH SCALE TECHNOLOGY

CROSS-REFERENCE TO RELATED APPLICATIONS, IF ANY

This application claims the benefit under 35 U.S.C. § 119(e) of U.S. Provisional Patent Application Ser. No. 62/770,559, filed Nov. 21, 2018, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field of the Invention

The present invention relates, generally, to weighing scales. More particularly, the invention relates to electronic strain gauge scale systems, apparatus, and methods. Most particularly, the invention relates to a system, apparatus and method for strain gauge weighing scales using a shear beam load cell.

2. Background Information About the Prior Art

Scales are devices used to measure the weight of objects. Scales used to measure the weight of very heavy loads must incorporate a robust design. A strain gauge scale utilizes a beam which, relative to a spring scale, can tolerate higher loads. The strain gauge commonly consists of an insulating flexible backing which supports a metallic foil pattern. The gauge is attached to the beam by a suitable adhesive. As the beam is deformed by the weight of a load, the foil is deformed, causing its electrical resistance to change. The scale therefore creates an electrical signal whose magnitude is directly proportional to the force exerted by the load.

Existing technology, in general, includes apparatus and/or methods for weighing scales.

This technology is believed to have significant limitations and shortcomings.

For these and other reasons, a need exists for the present invention.

All US patents and patent applications, and all other published documents mentioned anywhere in this application are hereby incorporated by reference in their entirety.

BRIEF SUMMARY

The present invention provides a weighing scale apparatus and method which are practical, reliable, accurate, safe, and efficient, and which are believed to fulfill a need and to constitute an improvement over the background technology.

In one aspect, the invention provides a weigh scale, comprising a base for mounting the scale to an external surface, a load cell assembly connected to the base, and a platform connected to the load cell assembly, the platform being adapted to engage a load to be weighed.

In another aspect, the invention provides a weigh scale including:
 a. a base for mounting the scale to an external surface, the base having an L-shaped configuration with a vertical member and a horizontal member extending from a bottom end of the vertical member;
 b. a load cell assembly connected to the base, the load cell assembly being a single point type load cell having an elongated beam body with a rectilinear configuration with first and second ends, the beam body having a flat top surface, first end of the beam body being connected to the base, the second end of the beam body being raised upwardly a predetermined distance from the remaining top surface, the second end of the beam body having a top surface which is connected to a bottom surface of the platform, and
 c. a platform connected to the load cell assembly and being adapted to engage a load to be weighed, the platform having a rectilinear peripheral geometry with flat top and bottom surfaces.

In a further aspect, the invention provides a weigh scale, including
 a. a base for mounting the scale to an external surface, the base having an L-shaped configuration with a vertical member and a horizontal member extending from a bottom end of the vertical member:
 b. a load cell assembly connected to the base, the load cell assembly comprising:
   i. a single point type, elongated beam body with a rectilinear configuration with first and second ends, the beam body having a flat top surface, first end of the beam body being connected to the base, the second end of the beam body being raised upwardly a predetermined distance from the remaining top surface, the second end of the beam body having a top surface which is connected to a bottom surface of the platform,
   ii. a spacer disposed between the top surface of the second end of the load cell and the bottom surface of the platform,
   iii. an extension disposed at the first end of the beam body;
 c. a platform connected to the load cell assembly and being adapted to engage a load to be weighed, the platform having a square peripheral geometry with flat top and bottom surfaces and a central region disposed equidistantly from four side edges, the bottom surface of platform being connected to the second end of the load cell at an area on the bottom surface which is outside the central region, and near a side edge thereof; and
 d. whereby the load cell extends outwardly from the base, above any external surface, and the platform extends inwardly above the load cell, and towards the base.

Other aspects of the invention include alternative load cell assemblies.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

FIG. 3 is top view of the scale.

FIG. 4 is a bottom view of the scale.

FIG. 5 is an end elevation view of the scale.

FIG. 6 is an opposite end view of the scale.

FIG. 7 is a further top view of the scale.

FIG. 8 is a cross-sectional view of the scale, taken along line 8-8 of FIG. 7.

FIG. 9 is an exploded view of the scale.

FIG. 10 is an exploded view of a first alternative embodiment of a load cell assembly of the scale.

FIG. 11 is a perspective view of a base of the assembly of FIG. 10.

FIG. 12 is another perspective view of the base.

FIG. 13 is an end view of the base.

FIG. 14 is a top view of the base.

FIG. 15 is a longitudinal cross-sectional view of the base taken at line AA of FIG. 14.

FIG. 16 is a perspective view, from above, of a load cell of the assembly of FIG. 10.

FIG. 17 is a perspective view, from below, of the load cell.

FIG. 18 is a top view of the load cell.

FIG. 19 is a bottom view of the load cell.

FIG. 20 is an end elevation view of the load cell.

FIG. 21 is a side view of the load cell.

FIG. 22 is a perspective view of the load cell taken at line 22-22 of FIG. 21.

FIG. 29 is a perspective view, from above, of a base of the assembly of FIG. 23.

FIG. 30 is a perspective view, from below, of the base.

FIG. 31 is a top view of the base.

FIG. 32 is a bottom view of the base.

FIG. 33 is an end elevation view of the base.

FIG. 34 is a side view of the base.

FIG. 35 is a perspective view of the base taken at line 35-35 of FIG. 34.

FIG. 36 is an enlarged view of a portion of die base taken at area "36" of FIG. 34.

FIG. 37 is perspective view, from above, of a third alternative embodiment of a load cell assembly of the scale.

FIG. 38 is a perspective view, from below, of the assembly.

FIG. 39 is a top view of the assembly.

FIG. 40 is a side elevation view of the assembly.

FIG. 41 is an end view of the assembly.

FIG. 42 is an opposite end view of the assembly.

DETAILED DESCRIPTION

The invention provides an efficient, effective scale used to weigh objects. Objects that are weighable include vehicles, manufactured articles, and packaged goods.

Figure 1:
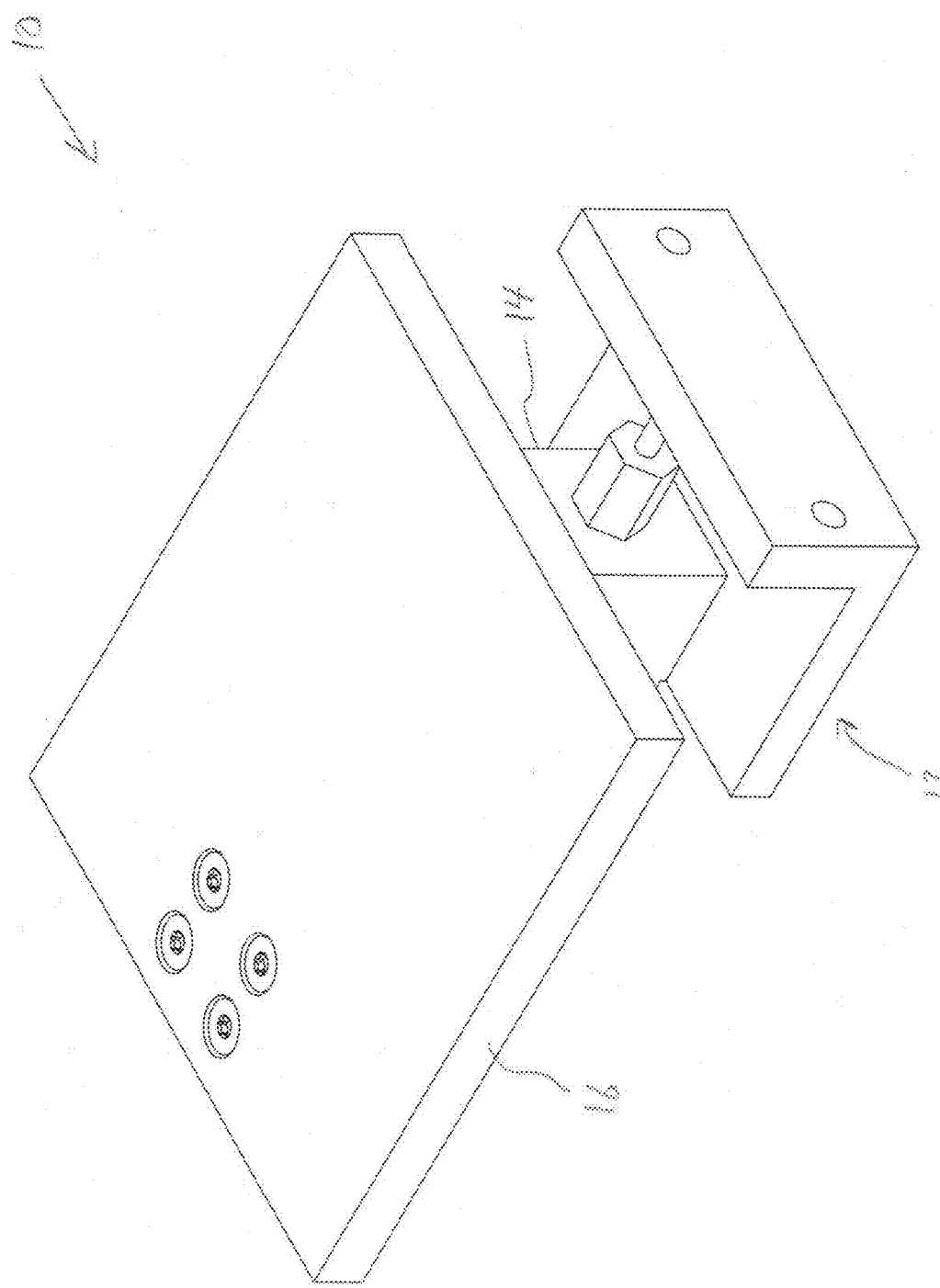
FIG. 1 is a perspective view of an embodiment of the scale of the invention.

FIG. 1 is a perspective view of an embodiment of the scale 10. This embodiment of the scale, and load cell assembly therefor, features a single point design. In this embodiment, the scale 10 is compact and portable. Referring also to FIG. 9, the scale 10 primarily comprises a mounting base 12, a load cell assembly 14, and a platform 16. In use, the mounting base 12 is adapted to be disposed on a flat surface such as a vertically disposed member (a wall or the like) or horizontally such as ground, a floor, or the like. The load cell 14 is coupled to the top side of the base mount 12. The platform 16 is coupled to the top side of the load cell 14.

In use an article is placed on the platform 16 of the scale 10. This exerts downward pressure on one end of the load cell 14. The load cell 14 experiences a deformation that is used to calculate the weight of the object through a change in the electrical resistance of a strain gauge or gauges which are adhered to the load cell 14.

Figure 2:
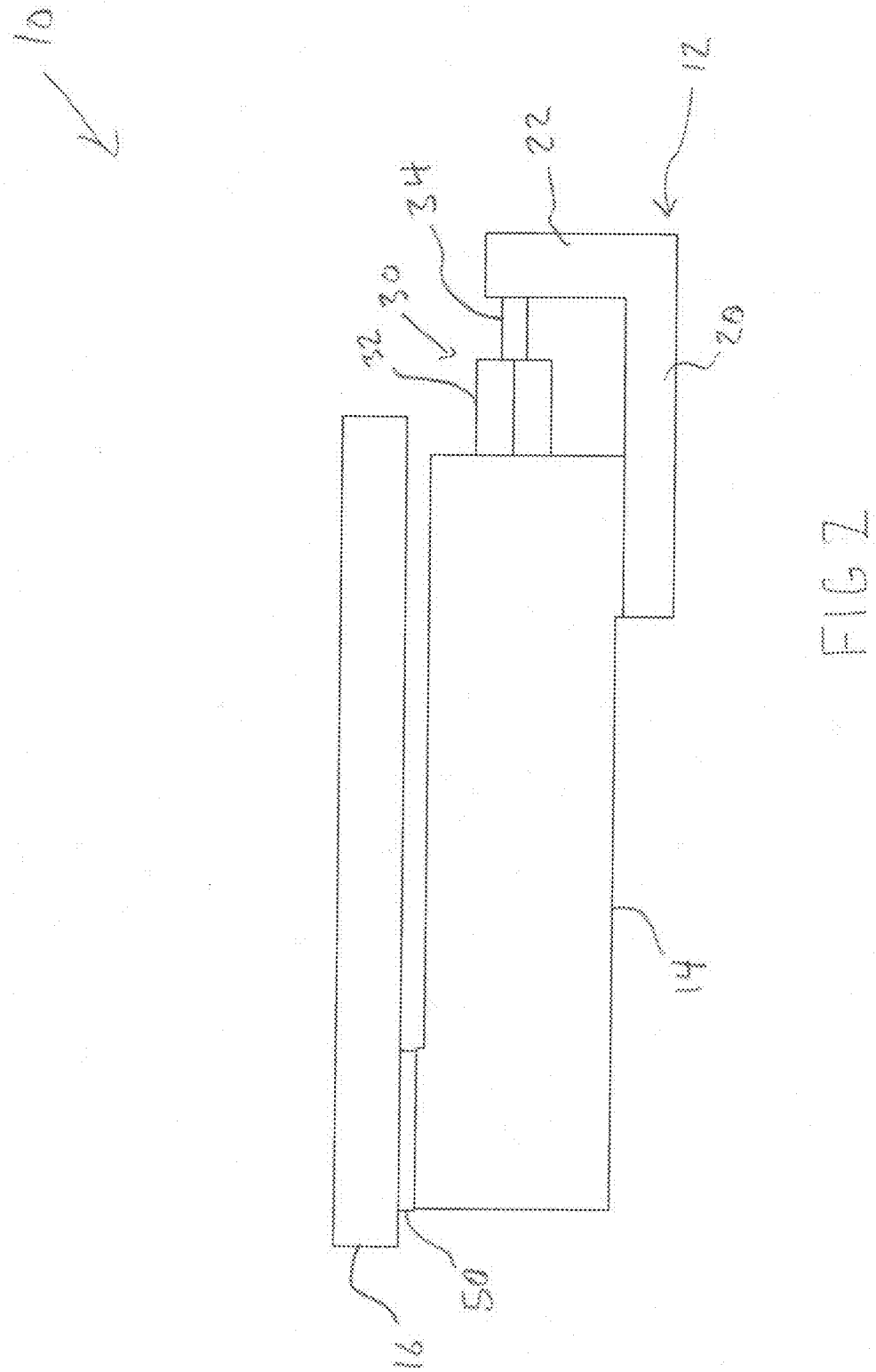
FIG. 2 is a front elevation view of the scale.

FIG. 2 is a front elevation view of the scale. FIG. 3 is top view of the scale. FIG. 4 is a bottom view of the scale. FIG. 5 is an end elevation view of the scale. FIG. 6 is an opposite end view of the scale. FIG. 7 is a further top view of the scale. FIG. 8 is a cross-sectional view of the scale, taken along line 8-8 of FIG. 7.

The base 12 has a horizontal member 20 with a rectangular configuration and a vertical member 22 extending upwardly from one end of the horizontal member 20. A plurality of bolts 24, preferably four, are used to couple the horizontal member 22 through bottom apertures 23. A pair of side apertures 25 are disposed in the vertical member 22. The base 12 is preferably constructed of a rigid metal material such as stainless steel.

In this embodiment, the load cell 14 is a single point, shear beam type load cell. It has a rectilinear, generally block shaped configuration. At a first end, it has a bottom platform 26. At the opposite end it has a top platform 28. Platform 26 has a plurality, preferably four, of bolt connection apertures 27. Likewise, top platform 28 has a plurality of apertures 29. A load cell extension 30 extends horizontally from the first end of the load cell 14. Extension 30 comprises a hexagonal base 32 and a cylindrical sub-extension 34, the sub-extension being inserted into an aperture 36 in the vertical member 22 of the base 12. A load cell spacer 50 is disposed on top of the top platform 28 and disposed between the load cell 14 and the platform 16. The load cell 14 body is constructed of a rigid metal material such as aluminum.

The platform 16 has a rectilinear configuration, preferably substantially square. The platform 16 is coupled to the load cell 14, via the spacer 50, via a plurality of bolts 60, preferably four. The platform 16 is preferably constructed of a rigid metal, preferably stainless steel.

In the scale 10 embodiment shown, the base 12, load cell 14 and platform 16 all have predetermined preferred dimensions. The device 10 is preferably made or manufactured by attaching all parts described at their respective connections described and by using the fastening means and methods shown and described.

FIGS. 10-22 disclose a first alternative embodiment of a load cell assembly 110. This embodiment of the assembly 110 is particularly suitable for aftermarket or retrofitting existing scales. As is best shown in FIG. 10, in an exploded view, the assembly 110 primarily comprises a base plate 112, a load cell 114, and a top loading block 116. The load cell 114 is coupled to one end of the base mount 112. The loading block 116 is coupled to the top side of the load cell 114. The base 112 is connected to the load cell 114 preferably via bolt. The top loading block 116 is connected to the top side of one end of the load cell. The block 116 is connectible to a platform or other means for holding or engaging a load to be weighed (not shown)

The top side of the base plate 112 includes an indentation 121, which is open on one end. The load cell 114 comprises a base 130 and an arm 132 extending from the center of the load cell base 130. The arm 132 rests on top of base plate 112 and is disposed within the indentation 121. Base plate 112 is connected to the load cell via screws through load cell base 130. A blade type flexure 120 is disposed on top of the load cell 114, being bolted to the load cell base 130 at one end and the arm 132 at the other. A spacer clamp 122 is bolted on top of the flexure 120 at the base 130 end, and the top loading block 116 is bolted on top of die flexure 120 at the arm 132 end of the load cell 114.

Figure 23:
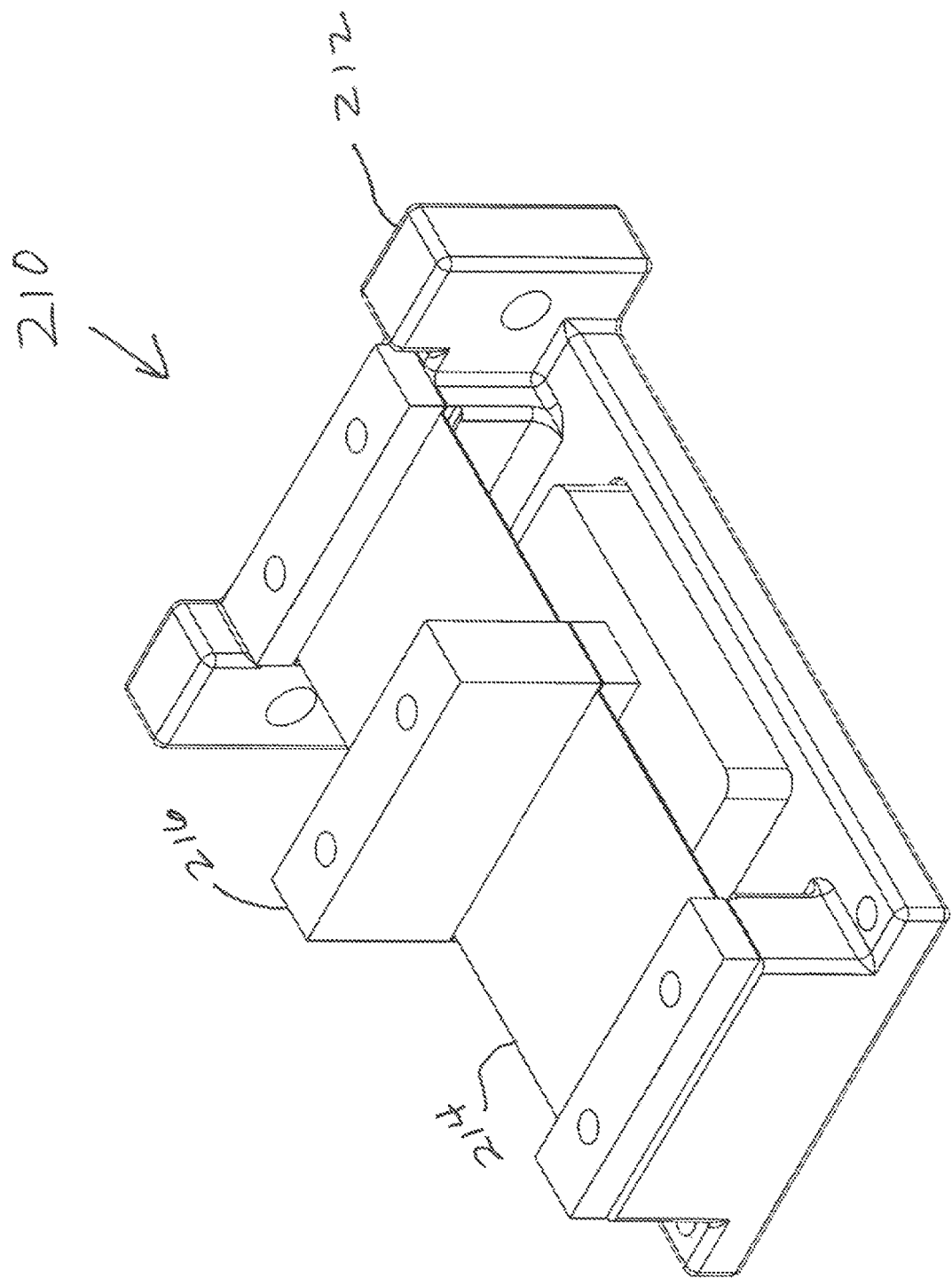
FIG. 23 is perspective view of a second alternative embodiment of a load cell assembly of the scale.
Figure 24:
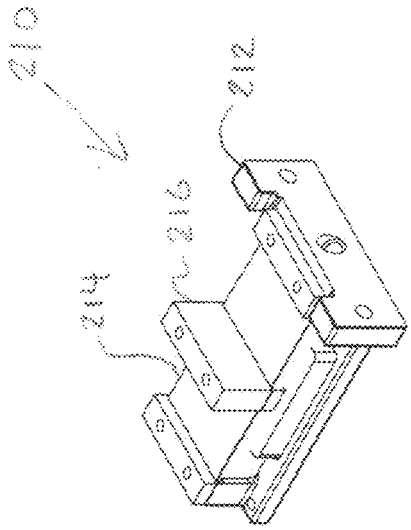
FIG. 24 is another perspective view of the second alternative embodiment of the load cell assembly of the scale.
Figure 28:
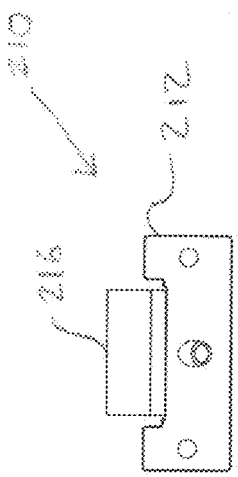
FIG. 28 is an opposite end view of the assembly.
Figure 25:
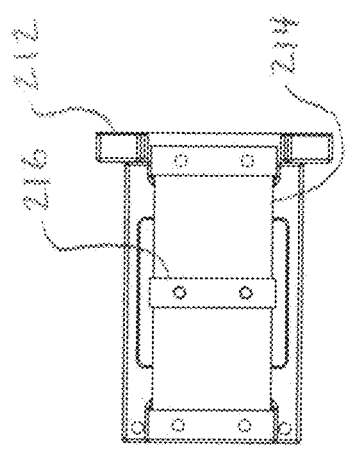
FIG. 25 is a top view of the assembly.
Figure 26:
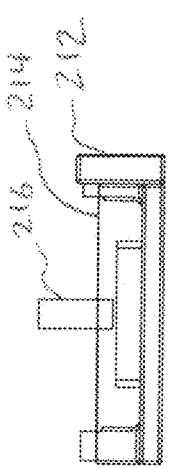
FIG. 26 is a side elevation view of the assembly.
Figure 27:
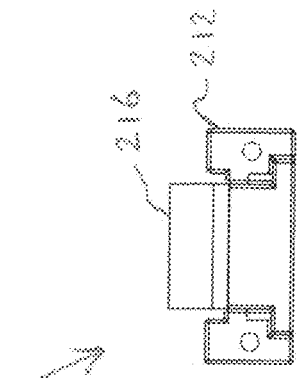
FIG. 27 is an end view of the assembly.

FIGS. 23-36 show a second alternative embodiment of a load cell assembly 210. This embodiment of the assembly 210 features a co-planar design. Referring to FIG. 23, a perspective view, the assembly 210 primarily comprises a base 212, a load cell 214, and a top loading block 216. The base 212 has a primary indentation 220 and a secondary indentation 222 within the primary indentation 220. FIGS. 24-28 illustrate the co-planar profile.

The load cell 214 is secured to the top side of the base on either end by two spacer clamps 215A & B and preferably two pairs of screws. A small block is connected to the bottom of the center of the load cell 214. A large block 232 is disposed within the primary indentation 222, and is connected to the bottom of the small block 230.

FIGS. 37-42 disclose a third alternative embodiment of a load cell assembly 310. The assembly 310 primarily comprises a base 312, a load cell 314, and a top loading block 316. The base 312 comprises a raised portion on each end, with a lower central surface. The load cell 314 is connected to the raised portions of the base 312 at each end, and to the top loading block 316 at a center point substantially equidistant between the ends. Two spacer clamps are disposed on the top side of the load cell 314 at each end, and are connected preferably via screws which also secure the load cell 314 to the base 312. A small block 322 is connected to the bottom side of load cell directly underneath the top loading block, preferably via screws.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A weigh scale, comprising a base for mounting the scale to an external surface, a load cell assembly connected to the base, and a platform connected to the load cell assembly, the platform being configured to engage a load to be weighed, wherein the load cell, assembly comprises a single point type load cell including an elongated beam body having a rectilinear configuration with first and second ends, the beam body having a flat top surface, first end of the beam body being connected to the base, the second end of the beam body being raised upwardly a predetermined distance from the remaining top surface, the second end of the beam body having a top surface which is connected to a bottom surface of the platform.

2. The weigh scale of claim 1, wherein the base is has an L-shaped configuration with a vertical member and a horizontal member extending from a bottom end of the vertical member.

3. The weigh scale of claim 2, wherein the load cell is connected to a top surface of the horizontal member by at least one fastener.

4. The weigh scale of claim 2, wherein the vertical member has at least one fastening point for connection to an external surface.

5. The weigh scale of claim 1, wherein the second end of the load cell is connected to the bottom surface of the platform by at least one fastener.

6. The weigh scale of claim 5, wherein the load cell assembly further comprises a spacer disposed between the top surface of the second end of the load cell and the bottom surface of the platform.

7. The weigh scale of claim 5, wherein the load cell assembly further comprises an extension disposed at the first end of the beam body.

8. The weigh scale of claim 1, wherein the platform has a rectilinear peripheral geometry with flat top and bottom surfaces.

9. The weigh scale of claim 8, wherein the bottom surface of the platform is connected to a top surface of the load cell assembly.

10. The weigh scale of claim 1, wherein:
the base is has an L-shaped configuration with a vertical member and a horizontal member extending from a bottom end of the vertical member; and
the platform has a square peripheral geometry with flat top and bottom surfaces and a central region disposed equidistantly from four side edges.

11. A weigh scale, comprising:
a. a base for mounting the scale to an external surface, the base having an L-shaped configuration with a vertical member and a horizontal member extending from a bottom end of the vertical member;
b. a load cell assembly connected to the base, the load cell assembly being a single point type load cell having an elongated beam body with a rectilinear configuration with first and second ends, the beam body having a flat top surface, first end of the beam body being connected to the base, the second end of the beam body being raised upwardly a predetermined distance from the remaining top surface, the second end of the beam body having a top surface which is connected to a bottom surface of the platform, and
c. a platform connected to the load cell assembly and being configured to engage a load to be weighed, the platform having a rectilinear peripheral geometry with flat top and bottom surfaces.

12. A weigh scale, comprising:
a. a base for mounting the scale to an external surface, the base having an L-shaped configuration with a vertical member and a horizontal member extending from a bottom end of the vertical member;
b. a load cell assembly connected to the base, the load cell assembly comprising:
i. a single point type, elongated beam body with a rectilinear configuration with first and second ends, the beam body having a flat top surface, first end of the beam body being connected to the base, the second end of the beam body being raised upwardly a predetermined distance from the remaining top surface, the second end of the beam body having a top surface which is connected to a bottom surface of the platform, ii. a spacer disposed between the top surface of the second end of the load cell and the bottom surface of the platform, iii. an extension disposed at the first end of the beam body;

c. a platform connected to the load cell assembly and being configured to engage a load to be weighed, the platform having a square peripheral geometry with flat top and bottom surfaces and a central region disposed equidistantly from four side edges, the bottom surface of platform being connected to the second end of the load cell at an area on the bottom surface which is outside the central region, and near a side edge thereof; and d. whereby the load cell extends outwardly from the base, above any external surface, and the platform extends inwardly above the load cell, and towards the base.

13. A weigh scale, comprising a base for mounting the scale to an external surface, a load cell assembly connected to the base, and a platform connected to the load cell assembly, the platform being configured to engage a load to be weighed, wherein:

the base is has an L-shaped configuration with a vertical member and a horizontal member extending from a bottom end of the vertical member;

the load cell has a elongated body with first and second ends and top surface, the first end of the body being connected to the horizontal member of the base and extending beyond the horizontal member predetermined distance, the second end of the beam body being raised upwardly a predetermined distance from the remaining top surface;

the platform has a square peripheral geometry with flat top and bottom surfaces and a central region disposed equidistantly from four side edges, the bottom surface of platform being connected to the second end of the load cell at an area on the bottom surface which is outside the central region, and near a side edge thereof; and whereby the load cell extends outwardly from the base, above any external surface, and the platform extends inwardly above the load cell, and towards the base.

14. A weigh scale, comprising a base for mounting the scale to an external surface, a load cell assembly connected to the base, and a platform connected to the load cell assembly, the platform being configured to engage a load to be weighed, wherein the load cell assembly includes a base, a load cell, and a top loading block, the base having at least one indentation, thee load cell being connected to a top side of the base, and further including a small block connected to a bottom surface of the load cell in the center thereof, and a large block disposed within the at least one indentation.

15. The scale of claim 14, wherein the load cell assembly has a co-planar geometry.

16. A weigh scale, comprising a base for mounting the scale to an external surface, a load cell assembly connected to the base, and a platform connected to the load cell assembly, the platform being configured to engage a load to be weighed, wherein the load cell assembly includes a base, a load cell, and a top loading block, the base having a raised portion on two ends and a lower central surface, the load cell being connected to the raised portions, and the load cell being connected to the to loading block at a center point substantially equidistantly between the ends.

* * * * *